June 16, 1953     L. VÁHL     2,642,342
METHOD OF CRYSTALLIZING SODIUM CARBONATE
Filed April 20, 1951
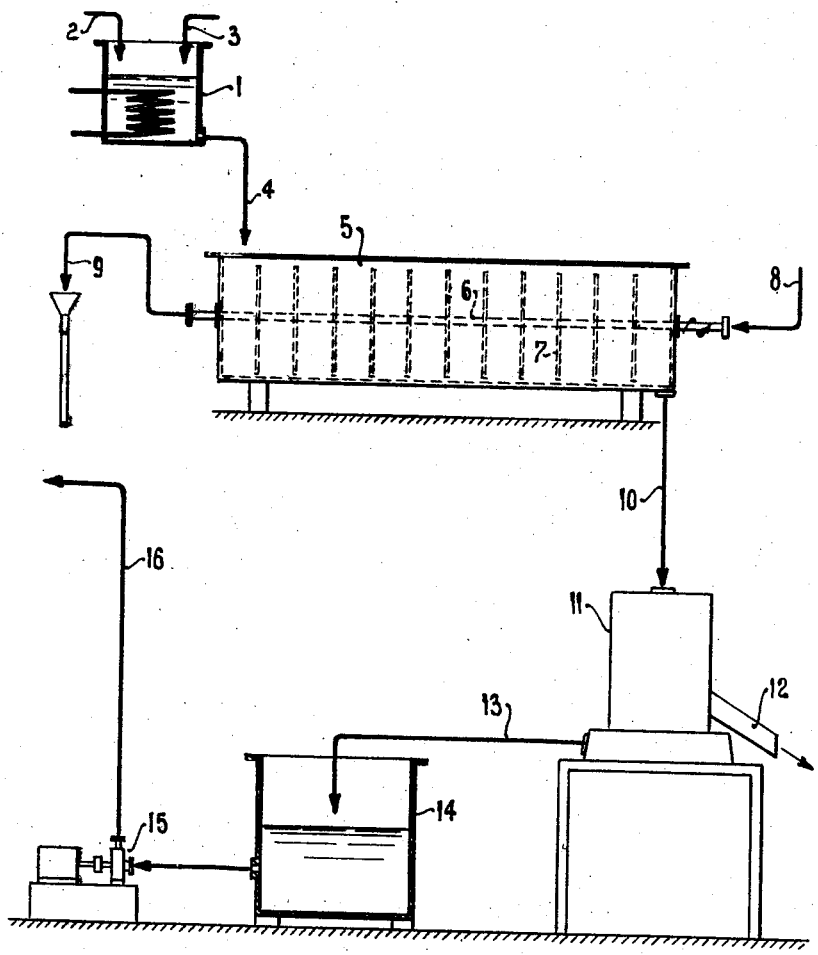
Inventor
László Váhl Patented June 16, 1953

2,642,342

UNITED STATES PATENT OFFICE 2,642,342

METHOD OF CRYSTALLIZING SODIUM CARBONATE

László Váhl, Muiderberg, Netherlands, assignor to Werkspoor N. V., Amsterdam, Netherlands, a company of the Netherlands Application April 20, 1951, Serial No. 221,973
In the Netherlands April 24, 1950

3 Claims. (Cl. 23—300)

Owing to the fact that sodium carbonate containing ten molecules of water of crystallization is very readily soluble in water, said decahydrate ($Na_2CO_3.10H_2O$) is for many purposes preferred to the anhydrous salt. The decahydrate of commerce consists either of lumps having a size exceeding 10 mm., or of small crystals having a size of about 0.5 mm. On exposure to a dry atmosphere said small crystals rapidly lose water, and in this "weathered" condition they bear a striking resemblance to common salt from which they are difficult to distinguish. For this reason the said first type of decahydrate is often preferred to said second type, although its manufacturing costs are higher and it cannot be put on the market in small packages.

The invention has for its object to crystallize the said decahydrate from its saturated solution, cooled to a temperature below 31.4° C., in such manner that the product strikingly differs from the said second type of the salt both as to size and to appearance of the crystals, without its manufacturing costs being appreciably higher. With this object in view, my invention consists in adding a small amount of one or more alginates, i. e. salts of alginic acid (polymannonic acid), to the solution of sodium carbonate from which the solute is to be crystallized. Preferably said amount is of the order of say 0.05 to 0.4% and, at all events, less than 5% by weight of the dry substance in the liquor. The organic salt (alginate) to be added may be, for instance, the sodium-, the ammonium- and/or the triethanol-amine-alginate.

It has been found that the addition of such an organic salt, or of a mixture of two or more of said salts in said small amount to the liquor from which the decahydrate is to be crystallized gives rise to crystals whose habitus is quite different from that of the well known decahydrate of the said second type, not only as to the appearance, but also as to the size of the crystals, the maximum linear dimension of which substantially exceeds that of the crystals of the said known type. Consequently, decahydrate produced in accordance with the present invention cannot be mistaken for common salt, not even at first glance.

I shall now proceed to describe the invention in further detail with reference to the annexed diagrammatic drawing.

The drawing illustrates a plant for crystallizing sodium decahydrate from a filtered saturated solution of sodium carbonate at a temperature below 31.4° C., to which the triaethanol-amine-salt of alginic acid has been added in an amount of 0.1% by weight of the dry substance in the said liquor. To facilitate the dosing, said alginate is added as a 5% solution continuously supplied by a pipe 2 to a tank 1, to which the saturated solution of sodium carbonate is continuously supplied by a pipe 3.

From the tank 1, the liquor is fed into a continuously operating crystallizer 5 in which a plurality of hollow, disk-like cooling elements 7 are mounted for rotative movement through the liquor on a hollow shaft 6. Cooling fluid such as water is supplied to said shaft by a pipe 8 and discharged therefrom by a pipe 9, the crystallizing mass being discharged by a pipe 10 into a continuously operated centrifugal machine 11. It will thus be understood that in the crystallizer 5 the liquor flows in countercurrent to the cooling agent.

In the crystallizer the liquor supplied thereto by the pipe 4 is cooled down from 31.4° C. to say about 20° C., whereby a mass is produced containing crystals in an amount of about 50%. From the centrifugal machine 11 the crystals, separated from the mother liquor, are discharged as at 12, the mother liquor being recycled by a pipe 13, a tank 14, a pump 15 and a pipe 16 to the tank (not shown) wherein the solution of sodium carbonate is prepared.

The product is constituted as small laminar crystals having a thickness of about 0.5 to 1.0 mm. and a size of 3–6 mm.

What I claim is:

1. A method of producing crystals from a substantially saturated solution of sodium carbonate by cooling said solution to a temperature below 31.4° C., which consists in adding a small amount of a salt of polymannonic acid to the said solution.

2. A method in accordance with claim 1, wherein the said salt is added to the said solution in an amount not exceeding 5% by weight of the dry substance in the said solution.

3. A method in accordance with claim 1, wherein the said salt is added to the said solution in an amount of 0.05 to 0.4% by weight of the dry substance in the said solution.

LÁSZLÒ VÁHL.

No references cited.